3,258,439
COATING COMPOSITIONS COMPRISING A VINYL CYCLIC ACETAL, A METALLIC DRIER AND A MOLECULAR SIEVE
Robert Arnold Braun, Newark, Del., assignor to E. I. du Pont de Nemours and Company, Wilmington, Del., a corporation of Delaware
No Drawing. Filed Aug. 23, 1963, Ser. No. 304,274
10 Claims. (Cl. 260—23.5)

This invention relates to coating compositions which cure by oxidation and particularly to novel coating compositions of this type which require a relatively short period of time for setting or curing after application to a substrate. The term "air curing" as used herein with respect to coating compositions refers to spontaneous conversion or setting of a coating of paint or the like by an oxygen-induced reaction to a condition in which the dried coating is no longer soluble in ordinary solvents in which the original liquid coating composition was soluble. Such air curing, in the instant invention as in the paint art, is most easily effected by exposing a brushed, sprayed or otherwise applied coating to the atmosphere (oxygen) at normal temperatures of about 40°–100° F.

Coating compositions of this invention have relatively short curing times and are produced by incorporating in a liquid paint or like material an unloaded molecular sieve. The latter are synthetic metal alumino-silicates having a three dimensional crystalline structure usually in the form of white powders with particles ranging from about 1 to 3 microns in diameter. Normally they are chemically inert in the presence of most compounds, except possibly strong acids, but in the present invention they appear to cooperate with the other ingredients of the coating composition to expedite curing of the paint film after it is applied to a surface and exposed to the atmosphere or other oxygen source. Molecular sieves are well known in the art but have for the most part been utilized in the form of loaded molecular sieves for introducing catalysts or other active materials to various systems. In certain instances they have been used to absorb liquids or gases in order to reduce odors of certain chemicals or to improve their shelf-life.

Molecular sieves have the general formula of crystalline zeolites which are represented by the following:

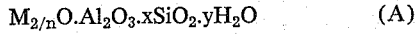

$$M_{2/n}O \cdot Al_2O_3 \cdot xSiO_2 \cdot yH_2O \quad (A)$$

where M represents a cation and $n$ its valence. In general, a particular crystalline zeolite will have values for $x$ and $y$ that fall in a definite range. A representative synthetic variety of molecular sieves has the following formula:

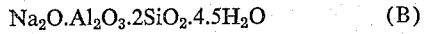

$$Na_2O \cdot Al_2O_3 \cdot 2SiO_2 \cdot 4.5H_2O \quad (B)$$

Unloaded molecular sieves having an average pore diameter of about 2–6 Angstroms (A.), preferably 4–5 A. are incorporated into coating compositions of this invention in amounts of about 1–3% based on the total weight of the composition. With substantially less than about 1% molecular sieves in the composition the curing time is not significantly improved. When substantially more than about 3% of the sieves are present, the viscosity of the composition is increased to an undesirable extent.

An essential organic film-forming component of the coating compositions of this invention is a compound containing a plurality of 1,3-cyclic acetal radicals having in the 2-position an alpha-ethylenically unsaturated substituent. A wide variety of such compounds is disclosed in U.S. Patents 3,010,918 and 3,010,923, and the compounds of these patents are useful as film-forming materials in this invention.

A preferred class of such acetal compounds for use in this invention is polycarboxylic acid esters containing a plurality of monovalent 2-vinyl-1,3-dioxolanyl radicals, because they dry relatively fast, have excellent coating properties and are easy and economical to make. The following compounds are representative of this preferred class:

Bis-[(2-vinyl-1,3-dioxolan-4-yl) butyl] orthophthalate
Bis-[(2-vinyl-1,3-dioxolan-4-yl) butyl] itaconate
Bis-[(2-vinyl-1,3-dioxolan-4-yl) butyl] maleate
Bis-[(2-vinyl-1,3-dioxolan-4-yl) butyl] fumarate
Bis-[(2-vinyl-1,3-dioxolan-4-yl) butyl] terephthalate
Bis-[(2-vinyl-1,3-dioxolan-4-yl) butyl] mesaconate
Tetrakis-[(2-vinyl-1,3-dioxolan-4-yl) butyl] pyromellitate
Tris-[(2-vinyl-1,3-dioxolan-4-yl) butyl] propane tricarboxylate
Bis-[(2-vinyl-1,3-dioxolan-4-yl) butyl] hexahydrophthalate
Bis-[(2-vinyl-1,3-dioxolan-4-yl) propyl] citraconate
Tris-[(2-vinyl-1,3-dioxolan-4-yl) propyl] trimellitate
Bis-[(2-vinyl-1,3-dioxolan-4-yl) propyl] isophthalate
Bis-[(2-vinyl-1,3-dioxolan-4-yl) methyl] maleate
Bis-[(2-vinyl-1,3-dioxolan-4-yl) methyl] glutarate
Bis-[(2-vinyl-1,3-dioxolan-4-yl) methyl] adipate Within the above mentioned preferred class a further preferred class is dicarboxylic acid diesters having two monovalent 2-vinyl-1,3-dioxolanyl radicals, several representative species of which are set forth above. These are especially preferred because they have the earlier mentioned characteristics in a high degree and have a relatively low viscosity.

Another kind of compound containing a plurality of acetal groups as described above, which is useful as an essential film-former in this invention, is a linear polymer having such acetal groups as extralinear substituents which are pendent from the main polymer chain. Such polymers can be prepared for example by transesterifying (a) a readily soluble preformed vinyl addition polymer having extralinear carbalkoxy groups (preferably $C_2$–$C_5$ carbalkoxy groups) attached to different carbon atoms, which carbon atoms have a hydrogen substituent, with (b) a hydroxyalkyl-substituted 1,3-cyclic acetal having in the 2-position an alpha-ethylenically unsaturated substituent.

It is desirable that the coating compositions of this invention contain a siccative metallic drier compound. These compounds are the well-known siccative metal-containing compounds or complexes which are commonly added to drying and semi-drying oil-containing paints, varnishes, enamels and the like to impart air-drying properties thereto or to improve the air-drying properties. Suitable metals are, for example, cobalt, lead, manganese, zinc, iron, nickel, chromium, cerium, calcium, aluminum, titanium, zirconium and magnesium. They are widely available and commonly used in the form of soluble soaps, salts and the like, such as the chlorides, acetates, hydrates, oxyhydrates, octoates, oleates, linoleates, naphthenates, resinates and alkyl esters of dicarboxylic acids (e.g., alkyl phthalate). Mixtures of such compounds can be used. Cobalt is a preferred metal.

The amount of metallic drier compound used is not critical and varies widely with the kind of metal, the character of the air-drying film-former(s) being used, the air-drying speed desired, and the air temperature.

Metallic drier compounds which are soluble in the composition are preferred, although it is usually expedient to add the drier as a solution in a common solvent.

Ordinarily the amount of metal drier compound used is equivalent to 0.0005%–3% of metal (in the drier) based on the total weight of air-drying film-forming material. When drying is to occur at normal room or ambient temperature, the amount of metal used is preferably about 0.01%–1.0%. When force-drying or baking is employed to shorten the drying period, the preferred amount of metal used is preferably 0.0005%–0.01%.

Although many useful compositions of this invention can be made using one or more of the above mentioned acetal compounds as the only class of air-drying film-former in the composition, other well-known film-formers can be used in admixture with the essential cyclic acetal component to modify film and application properties.

Representative of these film-forming additives are the unsaturated triglyceride oils such as linseed, soya, china-wood, perilla, dehydrated castor, safflower and oiticica oils, oleoresinous varnishes and alkyd resins modified with or embodying such oils or the fatty acid moieties normally contained in such oils, and mono and poly carboxylic acid esters of dihydropyranyl methanol. For coating compositions of this invention which can cure slowly by air-drying and which are normally baked or force dried at an elevated temperature to hasten the cure, the additives can also include alkyd resins modified with unsaturated oils (or the corresponding fatty acids) of the so-called non-drying class such as castor and coconut oil, epoxy resins such as the condensation products of an epihalohydrin and diphenol, amine-aldehyde resins such as alkylated urea formaldehyde and alkylated triazine formaldehyde resins.

A further class of film-forming material which is useful in modifying the film and application properties of the coating compositions of this invention is mono-acetals containing a single 1,3-cyclic acetal radical having in the 2-position an alpha-ethylenically unsaturated substituent. Examples of such modifiers are (2-vinyl-1,3-dioxolan-4-yl-butyl) pelargonate, (2-vinyl-1,3-dioxolan-4-yl-methyl) benzoate, and the corresponding oleates and stearates of each of these.

Other common ingredients of organic coating compositions can be included in the manner and proportions well known in the coating art. These include solvents and diluents, plasticizers, catalysts, hardeners, surface active agents and the like. Of these, solvent or solvent-diluent mixture is the most likely to be needed—to reduce the viscosity of consistency so that it is suitable for easy application, such as by spraying. Suitable solvents and diluents include aliphatic and aromatic hydrocarbons, esters, ketones and alcohols, and mixtures thereof.

Conventional pigments and extenders such as metal oxides, hydroxides, chromates, silicates, sulfides, sulfates, carbonates, organic dyes and lakes thereof and metal-flake pigments can be used, if desired, in the coating compositions of this invention in conventional amounts.

The following examples illustrate the principles and practice of this invention. It is to be understood that, since only a few representative embodiments are shown, other embodiments which yield analogous results can be easily prepared by substituting for all or part of a component suggested hereinbefore, with appropriate adjustments if necessary in the proportions or other conditions. Unless otherwise indicated, parts are given by weight. A molecular sieve having an average channel diameter of 4 A. is illustrated in these examples.

In the examples of coating compositions containing pigment, it is to be understood that the pigment is incorporated by any convenient one of the conventional grinding or dispersion methods known to persons skilled in the coating art. Usually the pigment is worked in a mill with part of the film-former until a smooth dispersion having the desired fineness is produced. Then the balance of the formula is admixed therewith. Since this is well known, the following examples are not burdened with detail in this connection and show only the ingredients and amounts. Unpigmented (clear) compositions of the examples are made by simply admixing the specified ingredients.

*Example 1*

In order to show the fast curing rate of compositions of this invention, a priming paint is prepared by mixing the following ingredients in the amounts set forth:

| | |
|---|---|
| Bis - [(2 - vinyl - 1,3 - dioxolan - 4 - yl) - butyl] orthophthalate | 16.5 |
| Bis - [(2 - vinyl - 1,3 - dioxolan - 4 - yl) - butyl] itaconate | 16.5 |
| Red Lead | 18.5 |
| Iron oxide | 43.4 |
| Anti-settling additive [1] | 0.82 |
| Anti-skinning additive [2] | 0.016 |
| Xylene | 3.86 |

[1] Methyl ethyl ketoximine.
[2] M-P-A—a polymeric resin dispersed in mineral spirits.

One sample (#1) of the above composition is brushed-out on a metal plate and permitted to stand under normal room conditions. To a second sample (#2) of the above composition is added an aqueous cobalt butyl phthalate solution in an amount to provide 2 milligrams of cobalt per 10 grams of the paint composition.

To another sample (#3) of the above composition is added a similar amount of cobalt and 2% by weight of Type 4A molecular sieve (Formula B). Samples #2 and #3 are brushed-out on separate metal test panels using normal painting technique so that all three films are of equal thickness and permitted to stand under normal room temperatures. The time for each of the paint films to cure to a tack-free state at 25° C. is shown in Table 1.

TABLE 1

| Sample | Co++ | Weight Percent Molecular Sieves | Cure Time |
|---|---|---|---|
| 1 | None | None | >8 hours. |
| 2 | 0.02% | None | 6 hrs. 20 min. |
| 3 | 0.02% | 2% | 4 hrs. 35 min. |

*Example 2*

To illustrate the broad applicability of this invention to paint compositions the following formulations are prepared (the molecular sieve being the unloaded Type 4A used in Example 1):

A. *Brushing primer for steel:*

| | Parts by wt. |
|---|---|
| Bis - [(2 - vinyl - 1,3 - dioxolan - 4 - yl) butyl] itaconate | 712 |
| (2-vinyl-1,3-dioxolan-4-yl-butyl) oleate | 612 |
| Tetrahydrofurfuryl methacrylate | 355 |
| 43% dehydrated castor oil modified alkyd resin solution, 56% solids | 761 |
| Red lead | 2952 |
| Iron oxide | 4924 |
| Aluminum stearate | 44 |
| Cobalt butyl phthalate solution (4% cobalt) | 54.7 |
| Zirconium octoate, basic; "Zirco" 6% zirconium | 72 |
| Molecular sieve | 207.2 |

B. Metal primer for dip application:

| | Parts by wt. |
|---|---|
| Bis - [(2 - vinyl - 1,3 - dioxolan - 4 - yl) butyl] itaconate | 313 |
| (2 - vinyl - 1,3 - dioxolan - 4 - yl - butyl) pelargonate | 83 |
| 63% linseed oil modified alkyd resin | 83 |
| Brown iron oxide | 347 |
| Zinc chromate | 258 |
| Calcium carbonate | 75 |
| Talc | 38 |
| Cobalt naphthenate solution (6% cobalt) | 5 |
| Molecular sieve | 23.9 |

C. Enamel for brush or spray application:

| | Parts by wt. |
|---|---|
| Bis - [(2 - vinyl - 1,3 - dioxolan - 4 - yl) butyl] orthophthalate | 580 |
| Bis - [(2 - vinyl - 1,3 - dioxolan - 4 - yl) butyl] itaconate | 200 |
| Titanium dioxide | 100 |
| Ferrite yellow | 63 |
| Phthalocyanine green | 50 |
| Cobalt octoate solution (8% cobalt) | 10 |
| Molecular sieve | 19.9 |

D. Enamel for brush or spray application:

| | Parts by wt. |
|---|---|
| Bis - [(2 - vinyl - 1,3 - dioxolan - 4 - yl) butyl] sebacate | 480 |
| Bis - [2 - vinyl - 1,3 - dioxolan - 4 - yl) butyl] itaconate | 160 |
| Titanium dioxide | 356 |
| Cobalt butyl phthalate (8% cobalt) | 8 |
| Molecular sieve | 19.9 |

E. Clear varnish for brushing on wood:

| | Parts by wt. |
|---|---|
| Bis - [(2 - vinyl - 1,3 - dioxolan - 4 - yl) butyl] fumarate | 1000 |
| Bis - [(2 - vinyl - 1,3 - dioxolan - 4 - yl) butyl] itaconate | 2000 |
| Ester gum | 1000 |
| Mineral spirits | 3000 |
| Cobalt octoate solution (8% cobalt) | 37 |
| Molecular sieve | 140 |

F. Aerosol self-spraying enamel:

| | Parts by wt. |
|---|---|
| Bis - [(2 - vinyl - 1,3 - dioxolan - 4 - yl) butyl] orthophthalate | 252 |
| Bis - [(2 - vinyl - 1,3 - dioxolan - 4 - yl) butyl] itaconate | 252 |
| Titanium dioxide | 389 |
| Toluene | 33 |
| Acetone | 60 |
| Cobalt butyl phthalate solution (8% cobalt) | 9 |
| Benzoyl peroxide | 5 |
| $CCl_3F$ propellent | 500 |
| $CCl_2F_2$ propellent | 500 |
| Molecular sieve | 19.7 |

G. Enamel for spray application:

| | Parts by wt. |
|---|---|
| Bis - [(2 - vinyl - 1,3 - dioxolan - 4 - yl) butyl] itaconate | 252 |
| Cyclic acetal polymer solution * | 720 |
| Titanium dioxide | 389 |
| Cobalt octoate solution (8% cobalt) | 0.5 |
| Molecular sieve | 272.2 |

*35% solution in xylene, 55:45 styrene:ethyl acrylate preformed polymer solution with ethyl radicals replaced via transesterification with 4-hydroxybutyl-2-vinyl-1,3-dioxolane. Polymers contain 33.8% by weight of (2-vinyl-1,3-dioxolan-4-yl) butyl moiety.

H. Baking metal primer for dip application:

| | Parts by wt. |
|---|---|
| Bis - [(2 - vinyl - 1,3 - dioxolan - 4 - yl) butyl] itaconate | 105 |
| (2 - vinyl - 1,3 - dioxolan - 4 - yl - butyl) oleate | 88 |
| Epoxide resin, "Epon" 828 | 19 |
| Urea formaldehyde resin, "Uformite" F24ON | 92 |
| Zinc oxide, zinc chromate | 80 |
| Inert fillers | 264 |
| Carbon black | 38 |
| 42% dehydrated castor oil modified alkyd resin | 119 |
| Cobalt octoate solution (6% cobalt) | 1 |
| Molecular sieve | 16.1 |

(Baking schedule, 30 minutes at 275° F.)

I. Black baking enamel for spray application:

| | Parts by wt. |
|---|---|
| Bis-[(2-vinyl-1,3-dioxolan-4-yl) butyl] maleate | 100 |
| 37% coconut oil modified alkyd resin solution, 50% solution in toluene | 1200 |
| Butylated urea formaldehyde resin solution, 50% solution in butanol | 600 |
| Carbon black | 50 |
| Cobalt octoate solution (6% cobalt) | 6.7 |
| Molecular sieve | 390 |

(Baking schedule, 20 minutes at 325° F.)

I claim:
1. An air-curing liquid coating composition consisting essentially of
   (a) a compound containing a plurality of 1,3-cyclic acetal radicals having in the 2-position an alpha-ethylenically unsaturated substituent,
   (b) a siccative metallic drier compound, and
   (c) an unloaded molecular sieve in the amount of about 1%–3% based on the total weight of the composition, said molecular sieve having an average pore diameter of about 2–6 Angstroms.

2. A composition of claim 1 in which the compound (a) is a polycarboxylic acid ester having a plurality of monovalent 2-vinyl-1,3-dioxolanyl radicals.

3. A composition of claim 1 in which the compound (a) is a dicarboxylic acid diester having two monovalent 2-vinyl-1,3-dioxolanyl radicals.

4. A composition of claim 1 in which the compound (a) is bis-[(2-vinyl-1,3-dioxolan-4-yl) butyl] orthophthalate.

5. A composition of claim 4 in which the siccative metallic drier compounnd is a cobalt compound.

6. A composition of claim 1 in which the compound (a) is bis-[(2-vinyl-1,3-dioxolan-4-yl) butyl] itaconate.

7. A composition of claim 6 in which the siccative metallic drier compound is a cobalt compound.

8. A composition of claim 1 in which the siccative metallic dried compound is a cobalt compound and the molecular sieve has an average pore diameter of about 4–5 Angstrom units.

9. A composition of claim 1 further containing (d) an air-curing film-forming material selected from the class consisting of unsaturated triglyceride oils, varnishes and alkyd resins modified therewith, and monocarboxylic fatty acid esters containing the 2-vinyl-1,3-dioxolanyl radical.

10. A composition of claim 1 in which said molecular sieve has the formula $Na_2O \cdot Al_2O_3 \cdot 2SiO_2 \cdot 5H_2O$.

References Cited by the Examiner

UNITED STATES PATENTS 3,010,924 11/1961 Ikeda _____ 260—23
3,033,778 5/1962 Frilette _____ 260—2

LEON J. BERCOVITZ, *Primary Examiner.*

R. A. WHITE, *Assistant Examiner.*